US010015300B2

(12) United States Patent
Park

(10) Patent No.: US 10,015,300 B2
(45) Date of Patent: Jul. 3, 2018

(54) APPARATUS AND METHOD OF CONTROLLING TRANSMISSION OF PERSONAL INFORMATION

(71) Applicants: HYUNDAI MOTOR COMPANY, Seoul (KR); KIA MOTORS CORPORATION, Seoul (KR)

(72) Inventor: Sung Woo Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/642,812

(22) Filed: Jul. 6, 2017

(65) Prior Publication Data

US 2018/0013872 A1 Jan. 11, 2018

(30) Foreign Application Priority Data

Jul. 11, 2016 (KR) .................. 10-2016-0087593

(51) Int. Cl.
*H04M 1/60* (2006.01)
*H04M 1/725* (2006.01)
*H04L 29/06* (2006.01)
*H04W 76/14* (2018.01)

(52) U.S. Cl.
CPC .......... *H04M 1/6091* (2013.01); *H04L 69/18* (2013.01); *H04M 1/7253* (2013.01); *H04W 76/14* (2018.02)

(58) Field of Classification Search
CPC ............ H04M 1/6091; H04M 1/7253; H04M 1/6075; H04M 1/6083; H04W 76/14; H04L 69/18
See application file for complete search history.

(56) References Cited

U.S. PATENT DOCUMENTS

| | | | |
|---|---|---|---|
| 9,766,801 B2 * | 9/2017 | Kato | G06F 3/0488 |
| 2012/0034954 A1 * | 2/2012 | Tabe | H04M 1/0202 |
| | | | 455/566 |
| 2013/0190978 A1 * | 7/2013 | Kato | G01C 21/3664 |
| | | | 701/36 |
| 2016/0006858 A1 * | 1/2016 | Grover | H04M 1/6083 |
| | | | 455/414.1 |
| 2016/0366711 A1 * | 12/2016 | Shanbhag | H04L 69/165 |
| 2017/0134788 A1 * | 5/2017 | Lee | G06F 9/45545 |
| 2017/0363439 A1 * | 12/2017 | Lee | G01C 21/3688 |

\* cited by examiner

*Primary Examiner* — Devan Sandiford
(74) *Attorney, Agent, or Firm* — Brinks Gilson & Lione

(57) ABSTRACT

The present disclosure provides a control method of an Audio Video Navigation (AVN) system for vehicles. The control method may include: connecting the AVN system to a terminal through a wired connection based on a first protocol, transmitting an activation signal to the terminal through the wired connection, receiving address information and acceptance information of the terminal for wireless connection with the terminal based on a second protocol through a specific application in the terminal activated based on the activation signal, automatically executing wireless connection with the terminal based on the acceptance information, and automatically requesting specific information to the terminal and receiving the specific information through wireless connection based on the acceptance information.

15 Claims, 4 Drawing Sheets

APPARATUS AND METHOD OF CONTROLLING TRANSMISSION OF PERSONAL INFORMATION

CROSS-REFERENCE TO RELATED APPLICATION

The present application claims priority to and the benefit of Korean Patent Application No. 10-2016-0087593, filed on Jul. 11, 2016, which is incorporated herein by reference in its entirety.

FIELD

The present disclosure relates to a control method of an audio video navigation ((AVN) system installed in a vehicle and an apparatus of executing the same.

BACKGROUND

The statements in this section merely provide background information related to the present disclosure and may not constitute prior art.

Many smartphone users utilize Bluetooth functions these days. With Bluetooth, people simply connect a smartphone with a vehicle.

Bluetooth connection starts when one device searches for the other device and makes a request for connection to the other device. Such connection includes: (i) a pairing process for communication registration between both devices; and (ii) a connection process that is conducted after registration.

An example of using such Bluetooth connection is a hands-free function. The hands-free function may reduce driver distraction caused by a phone call when driving. Thus, most vehicles provide such a function through an AVN system.

The hands-free function includes reception of an incoming call, input of a phone number, search for a phone number, etc. For this purpose, an AVN system of a vehicle may acquire phonebook information stored in a terminal, (i.e., smartphone), through a data path established by a communication protocol (i.e., Bluetooth).

When the data path is established, in case of a general Bluetooth connection method, a user should search for Bluetooth devices around the user, select one of the Bluetooth devices and select connection agreement, which might be a little inconvenient. Further, since information, such as a phonebook, may contain sensitive personal information, user acceptance is required prior to transmission of the information. A procedure of asking for terminal user's acceptance may be desirable prior to transmission of the information.

SUMMARY

The present disclosure provides an apparatus and method of controlling transmission of personal information.

One aspect of the present disclosure is to provide a control method in which a data path between a vehicle and a terminal may be conveniently established and a process of receiving user agreement to transmit personal information through the data path may be secured, and an apparatus of executing the same.

Another aspect of the present disclosure is to provide a control method in which a short range wireless communication path may be automatically established and a process of confirming acceptance of automatic connection and personal information transmission to execute transmission of data through the short range wireless communication path may be executed in any situation, and an apparatus of executing the same.

In some forms of the present disclosure, a control method of an Audio Video Navigation (AVN) system for vehicles includes: connecting the AVN system to a terminal through a wired connection based on a first protocol; transmitting an activation signal to the terminal through the wired connection, receiving address information and acceptance information of the terminal for wireless connection with the terminal based on a second protocol through a specific application is the terminal, activated based on the activation signal; automatically executing wireless connection with the terminal based on the acceptance information; and automatically making a request for specific information to the terminal according to the agreement acceptance information and then receiving the specific information through wireless connection.

In another form of the present disclosure, a control method of a terminal includes: connecting the terminal to an Audio Video Navigation (AVN) system for vehicles through a wired connection based on a first protocol; receiving an activation signal from the AVN system through the wired connection; activating a specific application based on the activation signal, wherein the specific application is pre-installed in the terminal; executing wireless connection with the AVN system based on a second protocol depending on whether the specific application is activated; and transmitting specific information to the AVN system depending on whether the specific application is activated, wherein activating the specific application further includes: receiving first acceptance information, wherein the first acceptance information is about determining whether to accept automatic wireless connection; and receiving second acceptance information, wherein the second acceptance information about whether to accept the automatic transmission of the specific information through the wireless connection.

In some forms of the present disclosure, an Audio Video Navigation (AVN) system for vehicles includes: a first communication unit configured to execute wired connection with a terminal based on a first protocol; a second communication unit configured to execute wireless connection with the terminal based on a second protocol; and a controller configured to transmit, with the first communication unit, an activation signal to the terminal and to receive, with the first communication unit, address information and acceptance information of the terminal for wireless connection with the terminal through a specific application in the terminal, wherein the specific application is activated based on the activation signal, and automatically execute, with the second communication unit, wireless connection with the terminal based on acceptance information, to automatically request specific information to the terminal through the wireless connection and then to receive the specific information through the wireless connection.

In some forms of the present disclosure, a control method of a terminal includes: connecting the terminal to an Audio Video Navigation (AVN) system for vehicles through a wired connection based on a first protocol; transmitting, with a specific application, address information of the terminal for wireless connection based on a second protocol through the wired connection, wherein the specific application is pre-installed in the terminal; executing wireless connection with the AVN systems initiating mirroring of a screen of the terminal through the wired connection; when the AVN system receives a request for transmission of specific information through wireless connection during initiation, mirroring the screen, with the AVN system, wherein the screen includes a menu regarding whether to accept transmission of the specific information from a user; and when the AVN system receives an event signal, transmitting the specific information to the AVN system based on the event signal through the wireless connection, wherein the event signal is depending on whether to accept the transmission of the specific information from the user.

In another form of the present disclosure, a control method of an Audio Video Navigation (AVN) system for vehicles includes: connecting the AVN system to a terminal through wired connection based on a first protocol; receiving, with a specific application, address information of the terminal for wireless connection based on a second protocol through the wired connection, wherein the specific application is pre-installed in the terminal; executing wireless connection with the terminal based on the address information; initiating mirroring of a screen of the terminal through the wired connection, requesting transmission of specific information through wireless connection to the terminal during initiation; mirroring the screen, with the AVN system, wherein the screen comprises a menu regarding whether to accept transmission of the specific information from a user; when a command is received, transmitting an event signal to the terminal, wherein the command is about determining whether to accept transmission of the specific information; and when the specific information corresponding to the event signal is received through wireless connection, storing the specific information.

In some forms of the present disclosure, a terminal includes: a first communication unit configured to connect to an Audio Video Navigation (AVN) system for vehicles through a wired connection based on a first protocol; a second communication unit configured to connect to the AVN system through wireless connection based on a second protocol; a memory configured to have a specific application pre-installed therein; and a controller configured to: transmit, with the specific application, address information of the terminal for wireless connection based on the second protocol; when the first communication unit connects the terminal to the AVN system through the wired connection, execute the wireless connection with the AVN system through the second communication unit and mirror a screen of the terminal through the first communication unit; when the AVN system receives a request for transmission of specific information through wireless connection during mirroring, mirror screen of the terminal with the AVN system, wherein the screen includes a menu regarding whether to accept transmission of the specific information from a user; and when the AVN system receives an event signal, transmit the specific information to the AVN system based on the event signal through wireless connection, wherein the event signal is depending on whether to accept the transmission of the specific information from a user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
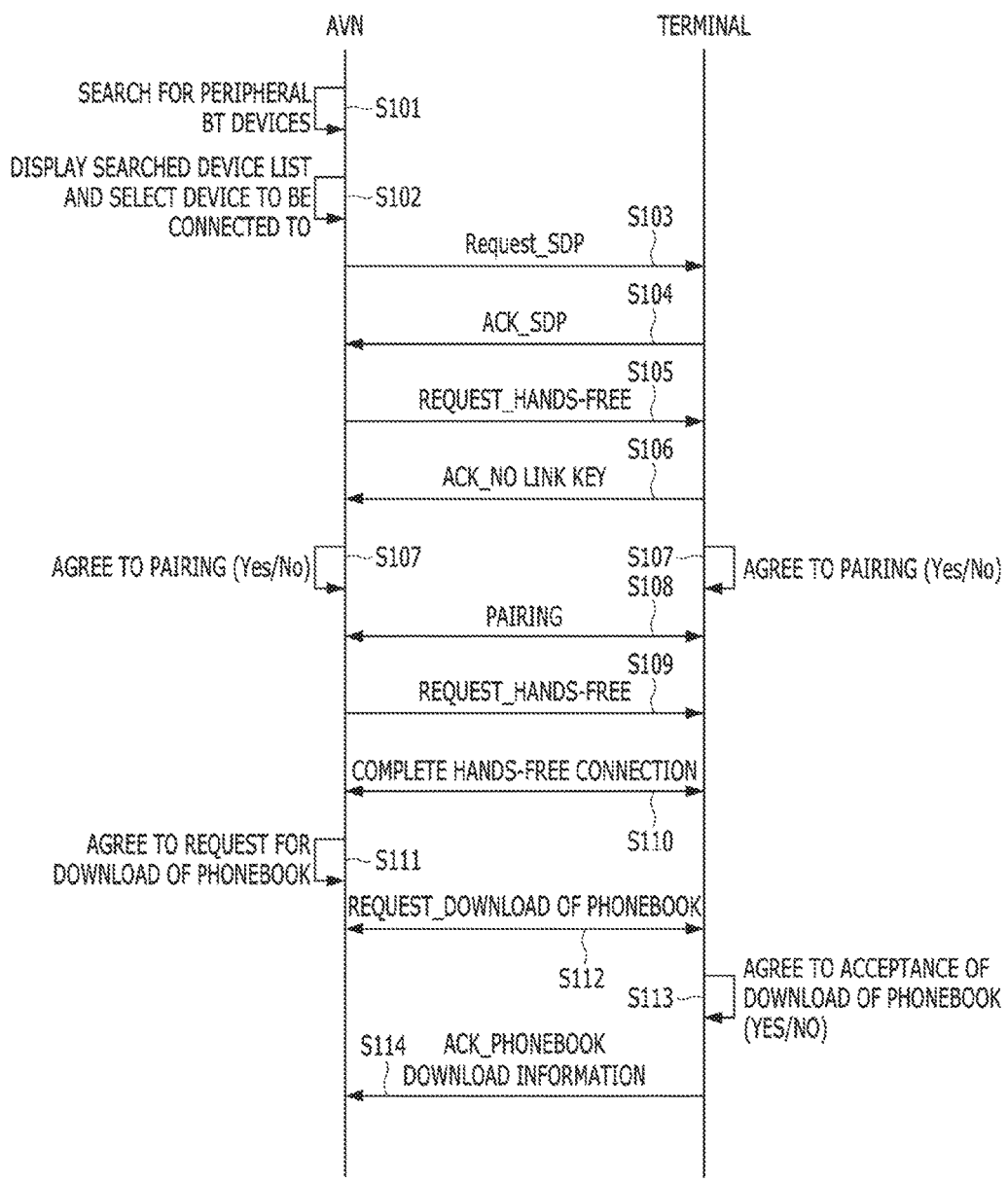
FIG. 1 is a schematic view illustrating a general process of transmitting personal information between a vehicle AVN system and a terminal.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description of the present disclosure, a detailed description of known functions and configurations incorporated herein will be omitted when it may make the subject matter of the present disclosure rather unclear.

First, with reference to FIG. 1, a general process of transmitting personal information between a vehicle AVN system and a terminal will be described. Hereinafter, it will be assumed that personal information is phonebook information and the personal information is transmitted from the terminal to the AVN system through Bluetooth connection.

FIG. 1 exemplarily illustrates a general process of transmitting personal information between a vehicle AVN system and a terminal.

With reference to FIG. 1, the vehicle AVN system first searches for devices, which support Bluetooth connection, around the vehicle AVN system so as to execute Bluetooth connection (Operation S101).

A result of search may be displayed as a list on a display of the vehicle AVN system, and a user may select a device to be connected to (Operation S102).

The AVN system exchanges request/response messages with the terminal according to a Service Discovery Protocol (SDP) with the selected device (Operations S103 and S104).

The AVN system makes a request for a hands-free function to the terminal (Operation S105), and the terminal may inform the AVN system of impossibility of pairing due to absence of an effective link (Operation S106).

Thereafter, a pairing procedure is started and, if a Secure Simple Pairing (SSP) method is applied, each of the AVN system and the terminal displays a message inquiring whether or not each device agrees to (accepts) pairing (Operation S107).

Thereafter, when each device accepts pairing, pairing is executed (Operation S108), and the AVN system again makes a request for the hands-free function to the terminal (Operation S109).

When hands-free connection is completed (Operation S110), the user operates the vehicle AVN system so as to execute a function of fetching a phonebook (Operation S111) and the vehicle AVN system correspondingly makes a request to download the phonebook to the terminal (Operation S112).

According to the request to download the phonebook from the vehicle AVN system, the terminal displays a message to confirm whether or not a terminal user agrees to download the phonebook (Operation S113) and, if the terminal user agrees to download the phonebook, the terminal may transmit phonebook information to the AVN system (Operation S114).

In the above-described procedure, during pairing and request for download of the phonebook, each of the terminal and the AVN system confirms whether or not the corresponding user agrees to/accepts paring and download of the phonebook, and such confirmation is executed manually in each operation and thus causes inconvenience.

Therefore, one form of the present disclosure proposes a method in which an application for Bluetooth pairing is installed in advance in a terminal and, when the application is started and thus activated, acceptance or rejection of automatic paring and agreement or disagreement on transmission of personal information are inputted in advance so that a subsequent process of separately inputting separate agreement or disagreement during pairing and transmission of personal information may be omitted.

Figure 2:
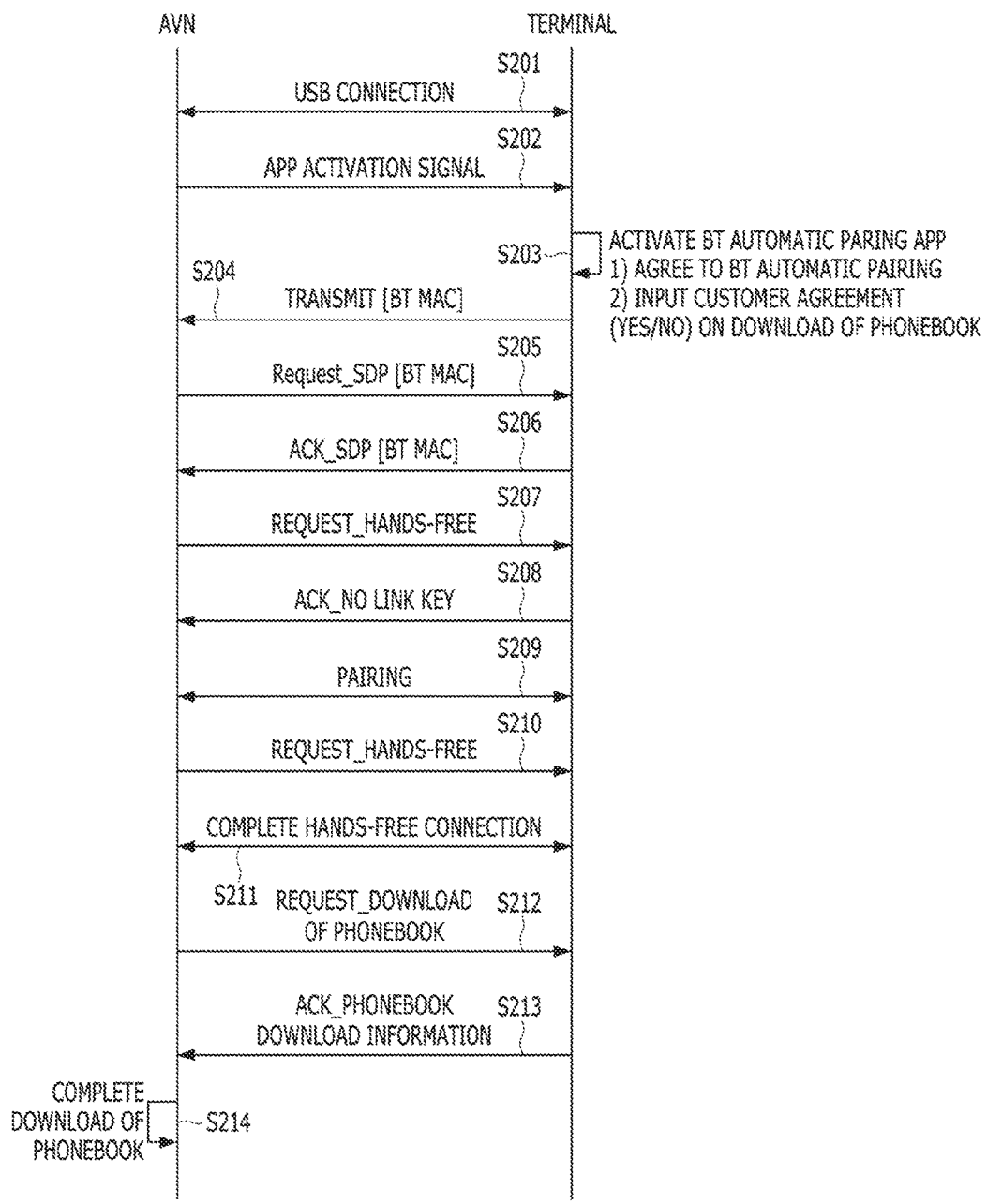
FIG. 2 is a schematic view illustrating a process of transmitting personal information.

FIG. 2 is a schematic view exemplarily illustrating a process of transmitting personal information in accordance with one form of the present disclosure.

In FIG. 2, it is assumed that an application to execute Bluetooth pairing (hereinafter, referred to as an "automatic pairing application" for convenience) is installed in advance in a terminal and the automatic pairing application is in an inactivated state (i.e., setting to execute the automatic pairing application is not completed) until a specific signal from a vehicle is received. Here, such an application installed in the terminal may be included in an Operating System (OS) of the terminal. For example, such an application may be "Android Auto "of Google Android OS, but the disclosure is not limited thereto.

First, when a vehicle AVN system and the terminal are connected through a USB via wires ((Operation S201), the AVN system transmits a signal to activate the automatic pairing application to the terminal through USB connection (Operation S202).

Then, the corresponding application in the terminal is activated (Operation S203). During a process of activating the automatic pairing application, the terminal may display a menu to get confirmation of agreement or disagreement on Bluetooth automatic pairing and confirmation of agreement or disagreement on download of personal information from a user.

When the user agrees to both automatic pang and personal information transmission and activation of the application has been completed, the corresponding application transmits a Bluetooth address BT MAC of the terminal to the AVN system (Operation S204). Here, acceptance information indicating that both agreement on automatic pairing and agreement on personal information transmission have been respectively completed, i.e., a completion message, may be transmitted to the AVN system together with the Bluetooth address BT MAC of the terminal. For example, the completion message (acceptance information) may include first acceptance information corresponding to agreement on. Bluetooth automatic connection and second acceptance information corresponding to agreement on personal information transmission.

The AVN system may automatically attempt service connection to the corresponding terminal without a separate process of searching for or selecting a connectable Bluetooth device using the Bluetooth address BT MAC of the terminal (Operations S205 and S206).

However, although the AVN system makes a request for a hands-free function to the terminal (Operation S207), if an effective link is not shared, pairing is disabled and thus the terminal informs the AVN system of absence of the effective link (Operation S208).

Here, since the AVN system has received the completion message indicating completion of agreement in advance, the AVN system attempts pairing immediately without inquiring about agreement or disagreement on pairing to the user (Operation S209).

When pairing has been completed, the AVN system again makes a request for the hands-free function to the terminal (Operation S210).

When hands-free connection has been completed thereby (Operation S211), the AVN system has received the completion message in advance and thus makes a request to download a phonebook to the terminal through Bluetooth connection without a separate user request or acceptance (Operation S212).

According to the request to download the phonebook from the vehicle AVN system, if the terminal has accepted personal information transmission in advance and may thus transmit phonebook information to the AVN system through Bluetooth connection without separate user confirmation, the AVN system may store the phonebook information transmitted from the terminal (Operation S214).

According to terminals, when a manufacturer releases a terminal to the market (before the terminal is delivered to a customer), the automatic pairing application may be activated in advance. In this case, the terminal manufacturer may set acceptance of automatic connection in advance, but it is difficult for the terminal manufacturer to set agreement on personal information transmission. Consequently, as described above with reference to FIG. 2, the method of receiving user agreement on personal information transmission in the activation operation of the application may not be applied.

Therefore, another form of the present disclosure proposes that, if an automatic pairing application of a terminal is automatically activated prior to connection to a vehicle, process of agreeing to personal information transmission is executed through terminal screen mirroring. Here, mirroring is technology in which the screen of the terminal is provided to the AVN system frame-by-frame so as to be displayed on a display of the AVN system. In general, a substantial corresponding screen is generated by the terminal but a display of the terminal is inactivated during mirroring. Further, when a specific point of the terminal screen displayed on a touchscreen of the vehicle AVN system is touched during mirroring, a corresponding touch event is transmitted to the terminal and thus the terminal may be operated as if a corresponding point of a touchscreen of the terminal is actually touched. As one example of a mirroring technology protocol, there is a mirror link, but the disclosure is not limited thereto. Hereinafter, another for of the present disclosure will be described with reference to FIG. 3.

Figure 3:
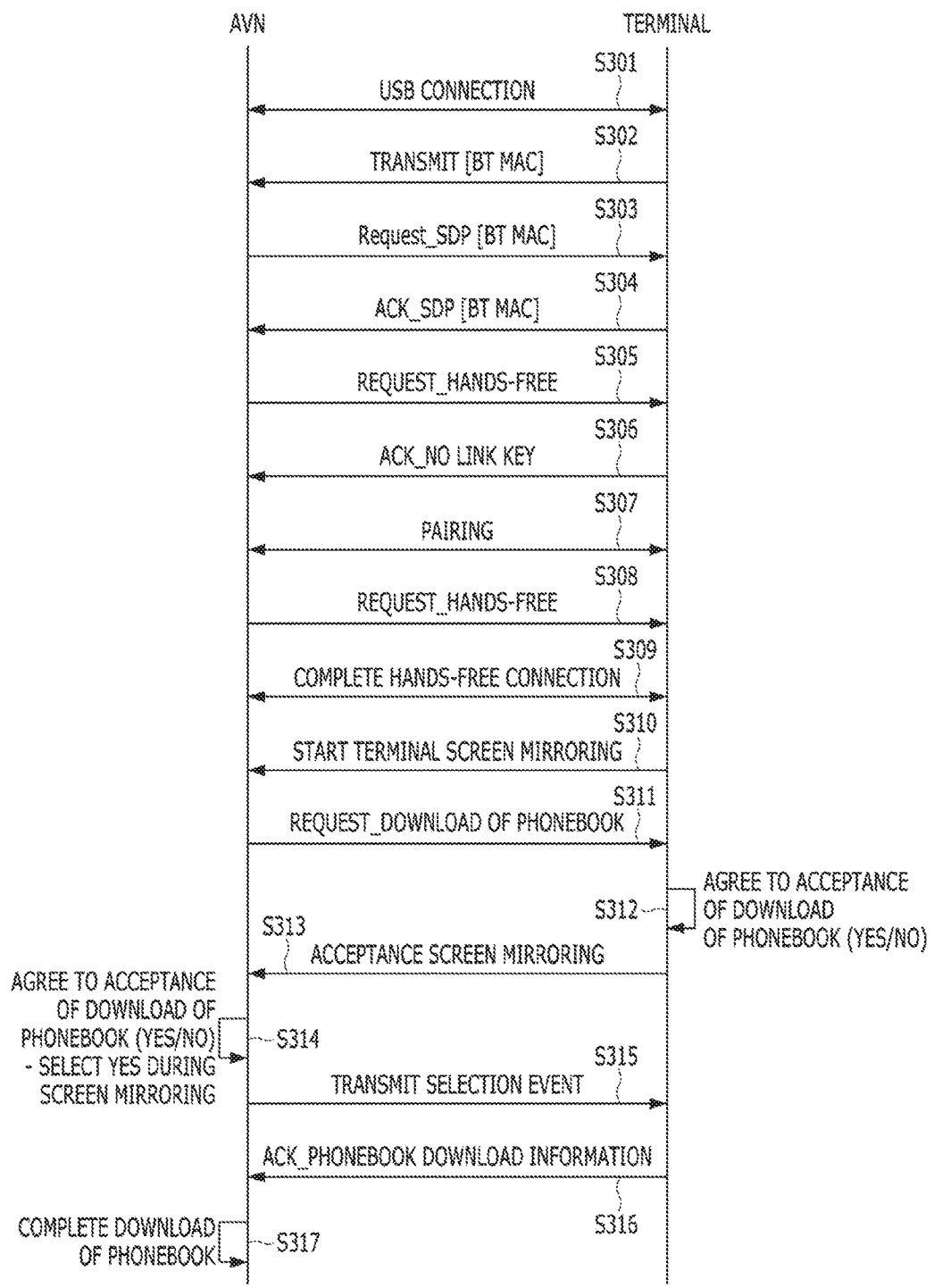
FIG. 3 is a schematic view illustrating a process of transmitting personal information.

FIG. 3 is a schematic view exemplarily illustrating a process of transmitting personal information in accordance with another form of the present disclosure. In FIG. 3, it is assumed that a terminal manufacturer activates an automatic pairing application in advance and an application which may execute mirroring is basically installed in a terminal. Further, it is assumed that exchange of data required to implement a mirroring function (a terminal screen image, a command event input through an AVN system, etc.) is executed through USB connection.

With reference to FIG. 3, first, a vehicle AVN system and the terminal are connected through a USB via wires (Operation S301). Since the automatic pairing application has been activated in advance, the corresponding application transmits a Bluetooth address BT MAC of the terminal to the AVN system immediately without a process of accepting agreement or disagreement on automatic pairing or personal information transmission (Operation S202). Of course, according to basic setting, a completion message indicating agreement on automatic pairing may be transmitted to the AVN system together with the Bluetooth address BT MAC of the terminal, but the completion message does not include agreement on personal information transmission.

The AVN system may automatically attempt service connection to the corresponding terminal without a separate process of searching for or selecting a connectable Bluetooth device using the Bluetooth address BT MAC of the terminal (Operations S303 and S304).

However, although the AVN system makes a request for a hands-free function to the terminal (Operation S305), if an effective link is not shared, pairing is disabled and thus the terminal informs the AVN system of absence of the effective link (Operation S306).

Here, if the AVN system has received the completion message indicating completion of agreement on automatic pairing in advance, or even if AVN system has not received the completion message, the AVN system may attempt pairing immediately without inquiring about agreement or disagreement on automatic pairing to the user (Operation S307).

When pairing has been completed, the AVN system again makes a request for the hands-free function to the terminal (Operation S308) and thereby hands-free connection may be completed (Operation S309).

As USB connection is maintained, the terminal may execute the mirroring application and thus mirroring of a terminal screen may be started (Operation S310).

If pairing has been completed and mirroring is being executed, the AVN system automatically makes a request to download a phonebook to the terminal through. Bluetooth connection (Operation S311).

In this case, in a general terminal, since there is no process of agreeing to personal information transmission, "no agreement on personal information transmission" is set. Therefore, if the AVN system automatically makes a request to download a phonebook to the terminal, the terminal rejects personal information transmission because no agreement on personal information transmission is set. Therefore, the AVN system may not receive agreement and may not receive phonebook information.

However, the terminal in accordance with this form outputs an acceptance agreement screen instead of rejection of transmission (Operation S312). Of course, not during mirroring, the display of the terminal displays the acceptance agreement screen but, during mirroring, the display of the terminal is generally inactivated and thus the acceptance agreement screen not information which is actually displayed through the display of the terminal.

The acceptance agreement screen is displayed through a display of the AVN system through mirroring (Operation S313). If the user selects acceptance (yes) on the acceptance agreement screen through the AVN system. (Operation S314), a selection event is transmitted to the terminal (Operation S315) and thus means that the terminal has actually accepted personal information transmission. Here, selection of acceptance (yes) in Operation S314 may be carried out by touching a touchscreen of the AVN system or operating a key button corresponding to touch at a point displaying a "yes" menu. Even if the "yes" menu is selected through any method, the AVN system may inform the terminal of occurrence of the selection event at the corresponding point through the mirroring application.

Then, the terminal may transmit phonebook information to the AVN system through Bluetooth connection (Operation S316), and the AVN system may store the phonebook information transmitted from the terminal (Operation S317).

Through the above-described forms, a personal information transmission acceptance procedure corresponding to the state of the automatic pairing application installed in the terminal may be secured in any case.

Hereinafter, the configuration of an apparatus to execute the above-described forms will be described.

Figure 4:
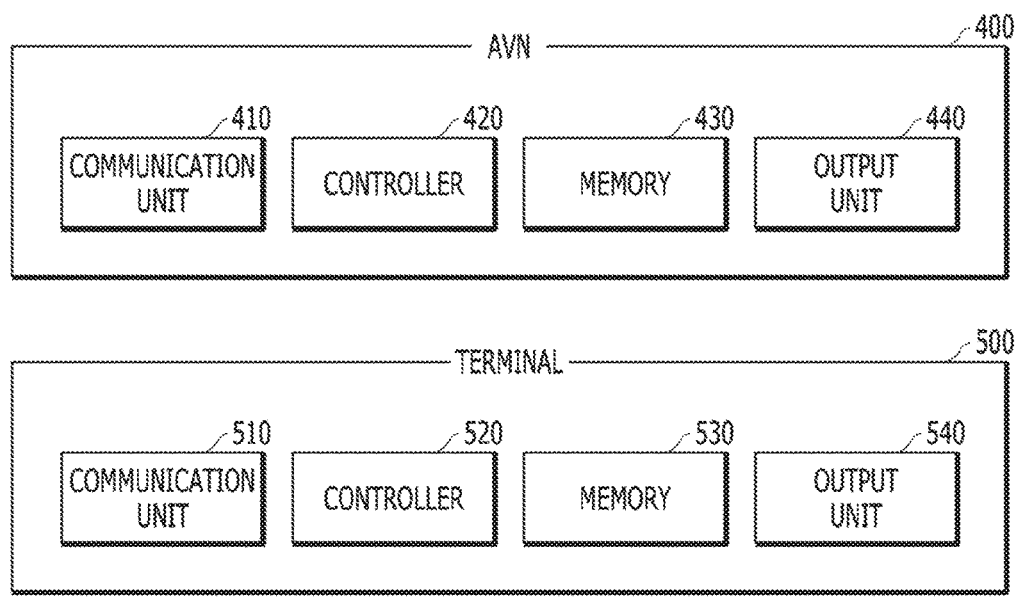
FIG. 4 is a block diagram illustrating structures of an AVN system and a terminal to execute a transmission control method.

FIG. 4 is a block diagram illustrating structures of an AVN system and a terminal to execute a transmission control method in accordance with one form of the present disclosure.

With reference to FIG. 4, an AVN system 400 and a terminal 500 may respectively include communication units 410 and 510, controllers 420 and 520, memories 430 and 530 and output units 440 and 540.

The elements shown in FIG. 4 are not essential and thus, it will be apparent to those skilled in the art that the AVN 400 and the terminal 500 may include a larger number of elements or a smaller number of elements.

The communication unit 410 of the AVN system 400 may include a first wired communication unit to communicate with other control units in a vehicle (for example, a CAN transceiver, etc.), a second wired communication unit for USB connection, and a wireless communication unit to support wireless communication, such as Bluetooth, Wi-Fi, etc.

The communication unit 510 of the terminal 500 may include a wired communication unit for USB connection and a wireless communication unit to support wireless communication, such as Bluetooth, Wi-Fi, 3G/4G, etc.

The controllers 420 and 520 of the AVN system 400 and the terminal 500 may control overall operations of the remaining elements. For example, the controller 420 of the AVN system 400 may execute general control of the vehicle, such as transmission of an application activation signal to the terminal, a process of making a request for paring/a hands-free function/a phonebook to the terminal, a mirroring process, etc., when USB connection is executed.

Further, the controller 520 of the terminal 500 may execute general control of the terminal (i.e., a process of activating the automatic pairing application when the application activation signal is received after USB connection is executed, a Bluetooth pairing process with the AVN system, a data transmission process according to agreement or disagreement on personal information transmission, a mirroring process, etc.)

The memories 430 and 530 are generic terms for spaces and/or areas to store designated program codes (OSs, firmware, applications, etc.) driven by the controllers 420 and 520 and data input/output when operations by the program codes are executed. The memories 430 and 530 may be provided as an Electrically Erasable and Programmable Read Only Memory (EEPROM), a Flash Memory (FM), a hard disk drive, etc.

The output units 440 and 540 serve to output various pieces of information as a designated type so that the user may recognize the information, and may at least include a display.

The above-described method in accordance with the form may be implemented as a program executable in a computer and stored in a computer readable recording medium. Computer readable recording media include a ROM, a RAM, CD-ROM, a magnetic tape, a floppy disk, an optical data storage system, etc. Further, the computer readable recording media may be realized as a carrier wave (for example, transmission over the Internet).

The computer readable recording media may be stored and executed as code which is distributed in a computer system connected by a network and is readable by computers in a distributed manner. Further, functional programs, code and code segments to realize the above-described method may be easily deduced by programmers skilled in the art.

As is apparent from the above description, an apparatus and method of controlling transmission of personal information in accordance with the present disclosure may have effects below.

First, a data path between a vehicle and a terminal may be established and a process of asking for user agreement to transmit personal information through the data path may be conveniently secured.

Particularly, when an application of the terminal is activated according to the state or the application of the terminal or during mirroring, agreement on personal information transmission may be executed and thus a user's privacy may be protected.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control method of an Audio Video Navigation (ANN) system for vehicles, the method comprising:
   connecting the AVN system to a terminal through wired connection based on a first protocol;
   transmitting an activation signal to the terminal through the wired connection;
   receiving address information and acceptance information of the terminal for wireless connection with the terminal based on a second protocol through a specific application in the terminal, wherein the specific application is activated based on the activation signal;
   automatically executing wireless connection with the terminal based on the acceptance information; and
   automatically requesting specific information from the terminal and receiving the specific information from the terminal through the wireless connection based on the acceptance information.

2. The control method according to claim 1, wherein the acceptance information comprises:
   first acceptance information, wherein the first acceptance information is about determining whether to accept the wireless connection; and
   second acceptance information, wherein the second acceptance information is about determining whether to accept automatic transmission of the specific information through the wireless connection.

3. The control method according to claim 2, wherein:
   executing the wireless connection is based on the first acceptance information; and
   automatically requesting and receiving the specific information is based on the second acceptance information.

4. The control method according to claim 2, the method further comprising:
   when the specific application is activated, receiving, by the terminal, the first acceptance information and the second acceptance information from a user.

5. The control method according to claim 1, wherein:
   the first protocol includes a USB protocol;
   the second protocol includes a Bluetooth protocol; and
   the specific information includes phonebook information.

6. A control method of a terminal, the method comprising:
   connecting the terminal to an Audio Video Navigation (AVN) system for vehicles through wired connection based on a first protocol;
   receiving an activation signal from the AVN system through the wired connection;
   activating specific application based on the activation signal, wherein the specific application is pre-installed in the terminal;
   executing wireless connection with the AVN system based on a second protocol depending on whether the specific application is activated; and
   transmitting specific information to the AVN system depending on whether the specific application is activated,
   wherein activating the specific application further comprises:
      receiving first acceptance information, wherein the first acceptance information is about determining whether to accept automatic wireless connection; and
      receiving second acceptance information, wherein the second acceptance information is about whether to accept the automatic transmission of the specific information through the wireless connection.

7. The control method according to claim 6, further comprising:
   when the specific application is activated, transmitting, with the specific application, address information of the terminal for the wireless connection and acceptance information to the AVN system, wherein the acceptance information comprises the first acceptance information and the second acceptance information.

8. The control method according to claim 6, wherein:
   executing the wireless connection is based on the first acceptance information; and
   transmitting the specific information is based on the second acceptance information.

9. The control method according to claim 6, wherein:
   the first protocol includes a USB protocol;
   the second protocol includes a Bluetooth protocol; and
   the specific information includes phonebook information.

10. A non-transitory computer readable recording medium having a program recorded thereon, the program to direct a processor to perform acts of:
   connecting the terminal to an Audio Video Navigation (AVN) system for vehicles through wired connection based on a first protocol;
   receiving an activation signal from the AVN system through the wired connection;
   activating a specific application based on the activation signal, wherein the specific application is pre-installed in the terminal;
   executing wireless connection with the AVN system based on a second protocol depending on whether the specific application is activated; and
   transmitting specific information to the AVN system depending on whether the specific application is activated,
   wherein activating the specific application further comprises:

receiving first acceptance information, wherein the first acceptance information is about determining whether to accept automatic wireless connection; and receiving second acceptance information, wherein the second acceptance information is about whether to accept the automatic transmission of the specific information through the wireless connection.

11. An Audio Video Navigation (AVN) system for vehicles, comprising:

a first communication unit configured to execute wired connection with a terminal based on a first protocol;

a second communication unit configured to execute wireless connection with the terminal based on a second protocol; and a controller configured to:

transmit, with the first communication unit, an activation signal to the terminal;

receive, with the first communication unit, address information and acceptance information of the terminal for wireless connection with the terminal through a specific application in the terminal, wherein the specific application is activated based on the activation signal;

automatically execute, with the second communication unit, wireless connection with the terminal based on the acceptance information;

automatically request specific information to the terminal through the wireless connection; and receive the specific information through the wireless connection.

12. The AVN system according to claim 11, wherein the acceptance information comprises:

first acceptance information, wherein the first acceptance information is about determining whether to accept the wireless connection; and second acceptance information, wherein the second acceptance information is about determining whether to accept transmission of the specific information through the wireless connection.

13. The AVN system according to claim 12, wherein the controller is configured to:

automatically execute the wireless connection based on the first acceptance information; and automatically request the specific information to the terminal and receive the specific information from the terminal based on the second acceptance information.

14. The AVN system according to claim 12, wherein, when the specific application is activated, the terminal is configured to receive the first acceptance information and the second acceptance information from a user.

15. The AVN system according to claim 11, wherein:
the first protocol includes a USB protocol;
the second protocol includes a Bluetooth protocol; and
the specific information includes phonebook information.

* * * * *